March 3, 1931.   C. W. GREEN ET AL   1,795,115
CASH REGISTER
Filed March 25, 1925   5 Sheets-Sheet 3

INVENTORS
Charles W. Green
Raymond E. Rice
BY
ATTORNEYS

March 3, 1931. C. W. GREEN ET AL 1,795,115
CASH REGISTER
Filed March 25, 1925 5 Sheets-Sheet 4
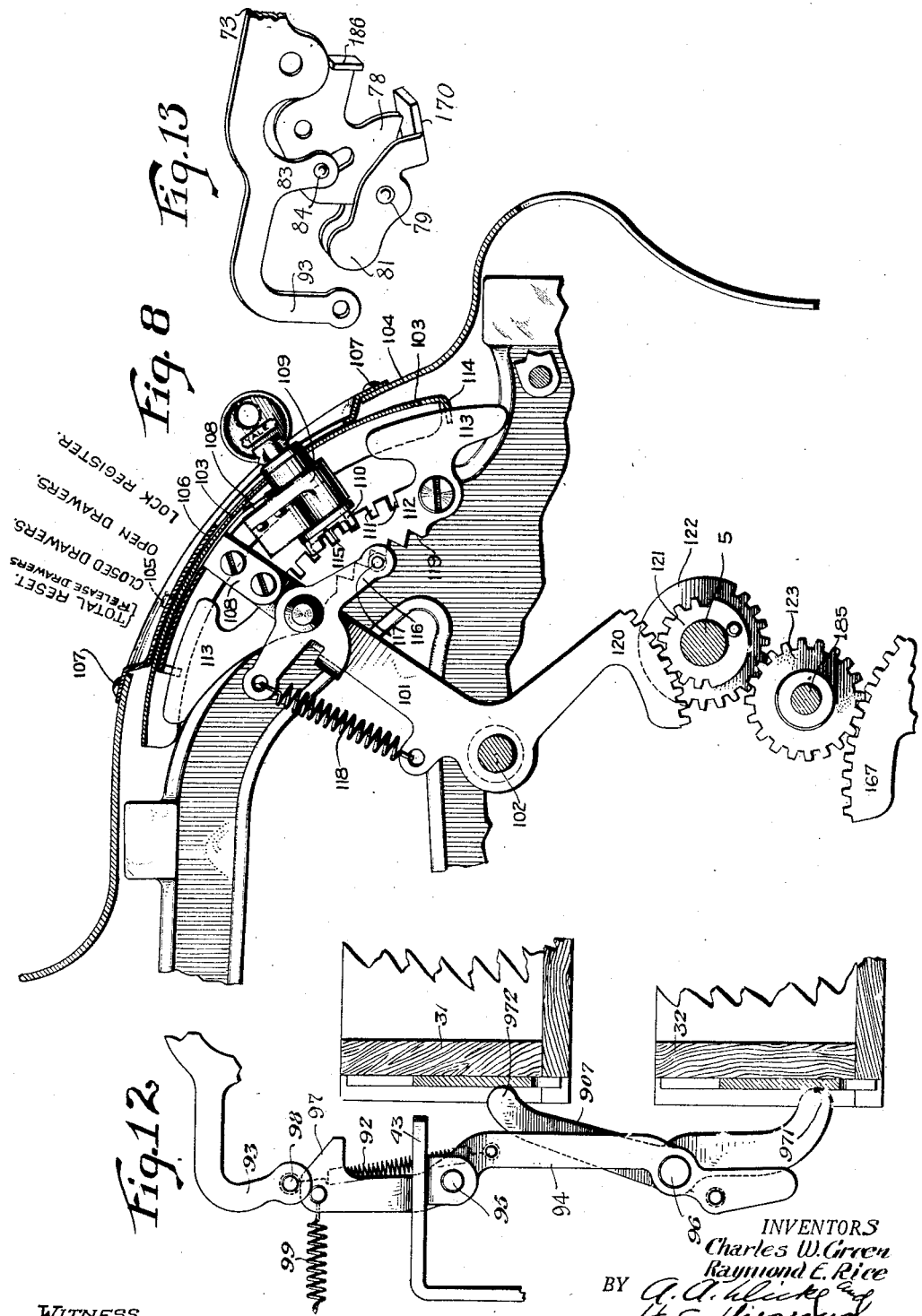
INVENTORS
Charles W. Green
Raymond E. Rice
BY
ATTORNEYS
WITNESS.
Albert J Hayes March 3, 1931. C. W. GREEN ET AL 1,795,115
CASH REGISTER
Filed March 25, 1925  5 Sheets-Sheet 5

WITNESS.
Albert S. Hayes

INVENTORS
Charles W. Green
Raymond E. Rice
BY
ATTORNEYS

Patented Mar. 3, 1931

1,795,115

UNITED STATES PATENT OFFICE

CHARLES W. GREEN AND RAYMOND E. RICE, OF ILION, NEW YORK, ASSIGNORS TO REMINGTON ARMS COMPANY, INC., A CORPORATION OF DELAWARE

CASH REGISTER

Application filed March 25, 1925. Serial No. 18,143.

This invention relates to multiple totalizer, multiple drawer cash registers or accounting machines constructed so that independent cash receptacles are provided for the clerks operating the register to permit keeping their cash accounts in separate compartments. When machines of this type are so constructed it is possible to place the responsibility for shortages or errors in the accounts upon the proper clerks, thereby forcing each clerk, to take every precaution against making errors in the transactions so that the amounts of money deposited in his particular drawer agrees with the amount accumulated by the corresponding totalizer.

In the accompanying drawings the improvements are shown in one form which they might take when applied to or embodied in machines of the type shown and described in the U. S. applications, Serial Number 263,125 filed November 9, 1918, and Serial Number 283,720 filed March 20, 1919 by Frederick L. Fuller as well as the British Patents 135,465, 157,823, 157,824, 157,825 for the same invention. This embodiment is only illustrative, however, as the improvements are capable of modification and change to permit applying them to machines of various types and it is the desire not to limit the use of the improvements to any one style of register or form of drawer cabinet.

With the above and other objects in view the invention consists in a novel combination and arrangement of parts, the features of novelty of which are pointed out in appended claims and a preferred form of embodiment of which is hereinafter described with reference to the drawings accompanying and forming part of this application.

Of said drawings:

Fig. 1 is a vertical transverse sectional view of the type of machine disclosed in the above mentioned Fuller applications with the improvements applied thereto. This view shows several of the amount keys, the totalizer and driving means therefor, the driving mechanism for the power shaft, part of the mechanism for selectively operating the drawer release device and the means for permitting the full extraction of a drawer by the proprietor or other authorized persons.

Fig. 8 is a view in side elevation showing in detail the centralized control mechanism and the means associated therewith for operating certain mechanism whenever it is desired to operate the machine in one of a plurality of different ways.

Fig. 12 is a detail view of the mechanism shown in Fig. 2 for controlling the operating mechanism by either of a plurality of cash drawers.

Fig. 13 is a perspective view of certain elements of the drawer releasing mechanism.

Figure 1:
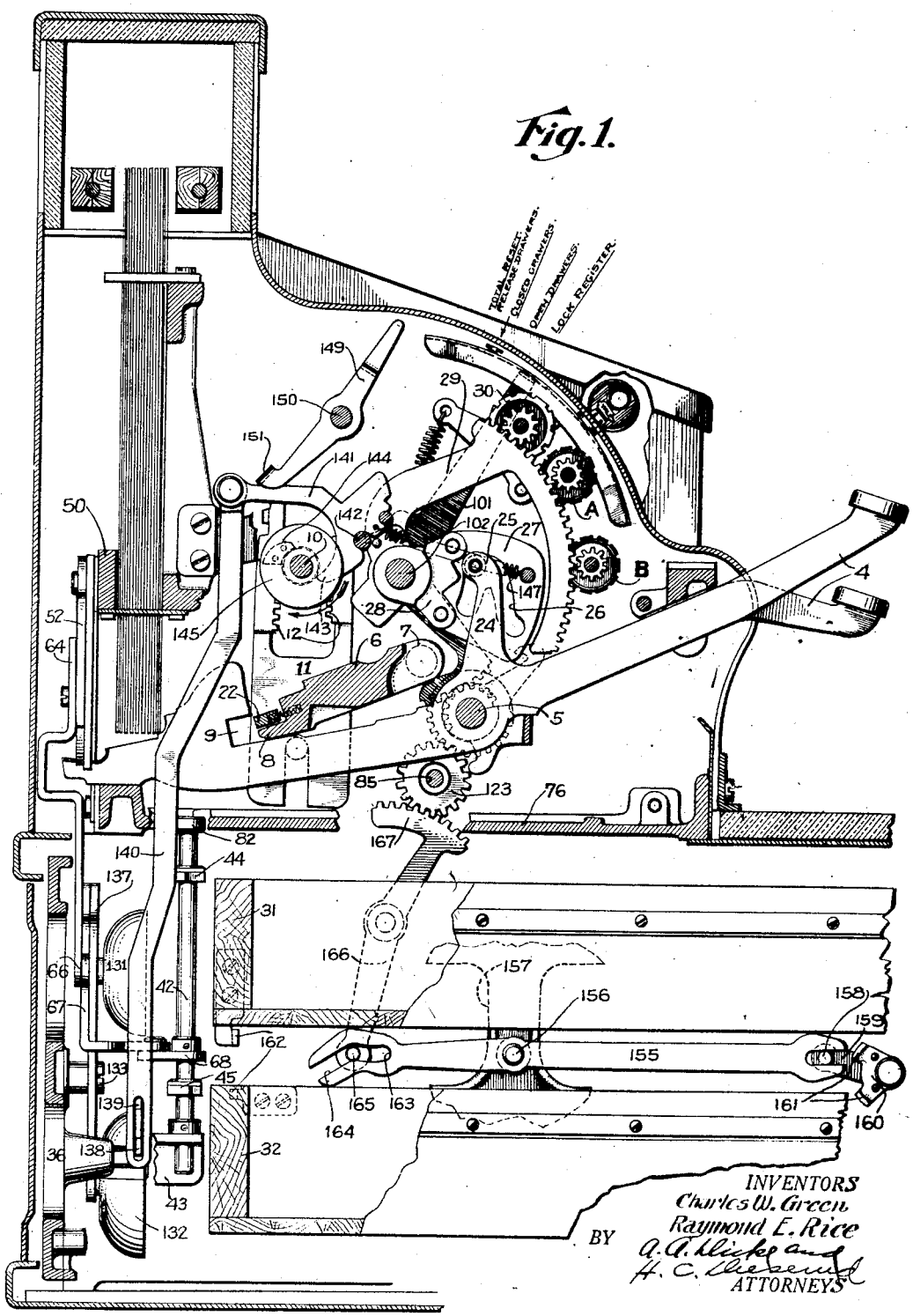

For convenience of description the principal features of the machine will be outlined and their general purpose and co-operation briefly explained in order to indicate the general operation of the machine as a whole, after which the preferred construction of the parts utilized to embrace these features will be described more in detail, together with the construction and operation of certain accessory mechanisms designed to prevent irregular and fraudulent operations of the register.

Cash registers which embody a plurality of cash drawers are generally so constructed that access to any desired drawer is accomplished by directly operating the corresponding key, or else depressing a key or setting a lever to the proper position and then by operation of another key releasing a spring or other motor which actuates the machine and opens the desired drawer. During the operation of the machine certain records are made upon a record strip contained within the machine or an imprint is made upon an inserted slip. The machine to which the present invention is applied has the above record strip printing feature so that the proprietor may have at all times a full record of every transaction made, such as, the nature and amount of the transaction and the clerk making the sale. In this manner the proprietor can ascertain what has transpired during his absence and can place individual responsibility upon the proper clerks for all shortages, errors, and acceptances of counterfeit money.

In order to inform the public, the proprietor and other clerks which clerk has operated the machine, registers are usually provided with an indicating device to designate the clerks operating the machine. While this information is available to those near the machine it is not obtainable by those at a distance, and for this reason the illustrative embodiment is equipped with a plurality of bells one for each clerk and differently toned thus informing those not within the limits of observation which drawer has been released. It is at times desirable to prevent the constant sounding of the alarms so additional mechanism is provided for disabling the bell sounding mechanism at will.

One of the disadvantages of multiple drawer register attachments is that usually no means is provided to compel each operator to close his drawer before a subsequent operation can be made. It has been possible heretofore for a clerk to extract money from the drawer of another clerk if the drawer happened to be opened and retained in its exposed position during a subsequent transaction. This allowed the clerk to extract the money at any time without detection of fraud and placed the responsibility for the shortage upon the wrong person.

For the above reason as well as many others which are quite obvious the present register employs a very simple mechanism for enforcing the closing of each receptacle or drawer before the machine can again be operated. This insures the proper operation of the machine at all times and decreases the opportunity for fraud because each operator knows that if his drawer is closed after an operation no one can obtain access to it unless the machine has been operated and a record made of the fact.

While this feature is quite desirable and necessary in some business institutions it might not be required in others, so that in order that the machine be adapted for all classes of business, devices are provided to permit operating the machine, without necessitating the closing of the drawers each time. The mechanism for controlling whether or not the machine can be operated with the drawers opened is under control of a lock, the key of which is in possession of the proprietor. By this means the proprietor has full control over the locking mechanism and can regulate the machine so that it can be operated in different ways at various times depending upon the circumstances.

Associated with the mechanism appurtenant to the centralized control are devices for effectively locking the register so that no one can operate the machine to release any of the drawers. When the centralized control is adjusted to a position designated as "Total and reset" position certain counter lids are released so that the machine may be reset and otherwise conditioned to accumulate amounts of sales pertaining to a subsequent period of business. When adjusted to this position certain mechanism comes into play to permit the simultaneous release of all the drawers thus obviating the necessity of operating the machine a number of times to release all the drawers in order to extract the cash when balancing the register.

The drawer release mechanism has usually been disposed in machines of this type so that it has been possible for a clerk to remove his cash drawer from the register so as to permit him to manipulate the drawer release mechanism to release other drawers and extract the money which they contained. To prevent this the present invention provides means for preventing the removal of a cash drawer from the cabinet until the centralized control mechanism is adjusted to a certain position, and as aforesaid this means is only under the control of the proprietor or certain other authorized persons.

The general organization and operation of the mechanism as a whole having been thus outlined, the preferred construction of the parts for accomplishing the above mentioned features will now be described more in detail and the constructions and operation of certain accessory mechanisms also explained.

The machine shown in the accompanying drawings is provided with the usual amount keys 4 pivoted upon a shaft extending transversely between the side frames of the machine. Resting upon the rear ends of the keys is a key coupler 6 journaled at 7 between the side frames. When the outer ends of the keys are depressed the key coupler is rocked clockwise (Figs. 1 and 2) and a nose 8 thereon enters notches 9 formed in the rear ends of the keys 4. The purpose of such key coupler mechanism is well known in the art and need not be discussed herein.

Extending transversely of the machine is a shaft 10 designated as the main operating shaft. This shaft is given a complete rotation at each operation of the machine and carries cams and other devices for operating various parts of the mechanism. The mechanism for accomplishing this comprises a vertically reciprocable rack plate 11 (Fig. 1) pivotally connected to the key coupler 6 and provided with oppositely facing rack teeth 12 which alternately mesh with a pinion 2 (Fig. 11) fast upon the shaft 10 as the coupler is reciprocated. In this manner a complete reciprocation of the rack plate 11 will effect a complete rotation of the main operating shaft 10. This mechanism is not described herein in detail, as it is so old and well known in the art.

Figures 9, 10, 11:
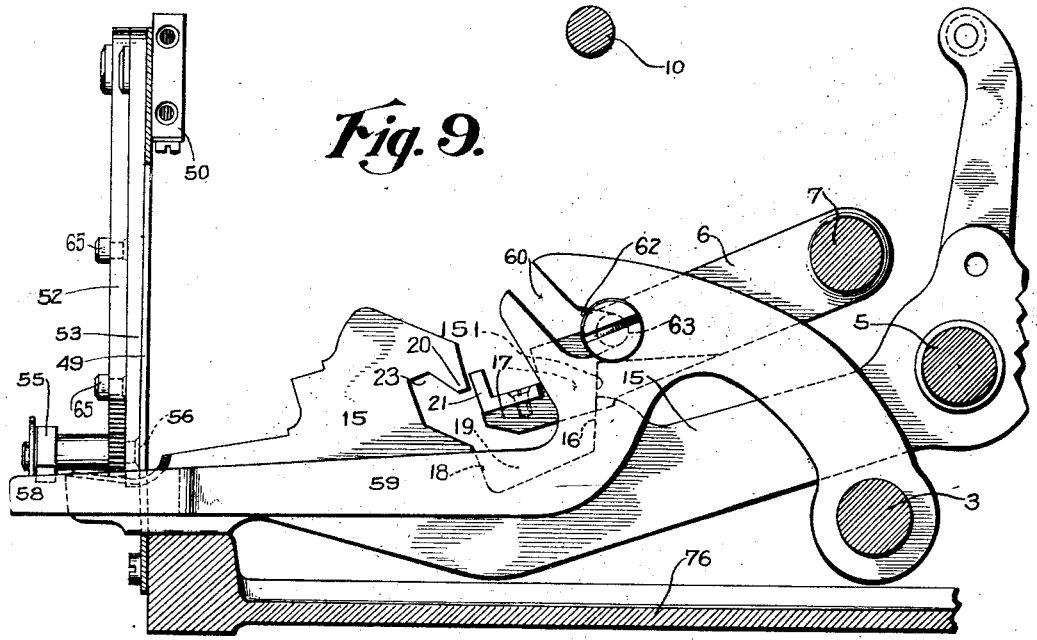
Fig. 9 is a view in side elevation with a number of parts omitted for the sake of clearness showing one of the special coupler lifting keys and the lock for the operating mechanism.
Fig. 10 is a top plan view of some of the mechanism shown in Fig. 2 illustrating the relationship between the drawer catch release lever, the locking slide for the key coupler and the devices for operating the latter.
Fig. 11 is a detail view in side elevation showing the devices used for insuring a complete operation of the machine before a subsequent operation can be made.

In nearly all forms of cash register construction it is necessary, after a registration is commenced that some device be provided to compel a complete performance of the started registration before a second operation can be effected. One form that this mechanism might take is illustrated in Fig. 11. Secured to the main operating shaft 10 is a ratchet wheel 13 against which bears a spring pressed pawl 14 for preventing any retrograde motion of the shaft 10 and insuring a complete operation of the machine.

The present machine is provided with two special keys 15 and 471 (Figs. 5 and 9) designated as clerk's or classification keys and are located at the extreme left of the keyboard. These keys have a special function, whereby when either of them is depressed through a small arc of movement it lifts the coupler to a predetermined point and arrests its movement at this particular point. This point is known as the "coupling point", and when the coupler is in this position other keys may be connected to the coupler and the registration completed by the depression of any selected amount or transaction key.

The means for accomplishing this will now be described. Each key 15 or 471 is formed with a coupler lifting cam surface 16 (Fig. 9) formed on its rear end and co-operating with a face 151 on the rear edge of a shoulder 17 on the coupler 6. The edge 18 of the notch 19 in each clerk's key provides a stop face which engages the rear edge of the shoulder 17 of the coupler 6.

Whenever a clerk's key is depressed the cam surface 16 contacting with the shoulder 151 will lift the coupler to its "coupling point" until the rear edge of the coupler contacts with the edge 18 of the notch 19 in the key by virtue of the eccentricity of the pivots of the key and coupler, thereby arresting the movement of these parts. The key coupler is retained in its partially elevated position by the pawl and ratchet wheel mechanism (Fig. 11) hereinbefore described. When pressure is released from the outer end of the depressed clerk's key the key will fall partly back by virtue of its weight until a downwardly extending finger 20 strikes the top of an angular piece 21 secured to the shoulder of the coupler whereby the key will remain partially depressed and will be attached to the coupler.

Referring to Fig. 1 there will be seen a movable spring pressed plate 22 mounted upon the nose 8 of the coupler 6, a plate being provided for each group of keys. Whenever the coupler has been elevated and retained in its key coupling position, the nose 8 of the coupler and plate 22 will be slightly above the notches 9 in the undepressed amount keys 4. Upon a slight depression of any selected key in a bank the plate 22 associated therewith will be first forced forwardly and will then spring into the notch 9 of the depressed amount key and will thereby attach this key to the coupler. Other keys from other banks may be attached to the coupler in the same manner and a complete operation of the machine effected by fully depressing any one of the displaced keys. The clerk's keys 15 and 471 have their notches 19 enlarged as at 23 (Figs. 2 and 9) to receive the angular piece 21 as the rear end of each clerk's key is lifted to its highest position by an elevation of the coupler. It will be understood that where the coupled clerk's key is rocked further by the engagement of the finger 20 with the angular piece 21 as the coupler is locked there will be no interference between the rear end of shoulder 17 and the surface 18, due to the special formation of the opening in the key.

Each value or amount key 4 is provided with an upwardly extending arm 24 (Fig. 1) carrying a stud 25 co-operating with slots 26 in plates 27, the slots 26 being graduated so that the depression of the amount keys will impart a differential movement to the frames 28 to which the plates 27 are secured. Rigid with each frame 28 is a segmental rack 29 meshing with a pinion secured to a corresponding type carrier 30 so that movement of the segment 29 by an operation of a key sets up on a type carrier a number corresponding to the value of the key depressed.

It is to be understood that the amount keys are arranged in banks and that for each bank there is a differentially actuated frame 28, a segmental rack 29 and an item type carrier 30.

Rotatably mounted below the item type wheels 30 and engaging the segmental racks 29 are pinions attached to number wheels of printing totalizers designated as "A" and "B" in Fig. 1 of the drawings. The totalizers may be utilized for the purpose of registering amounts for separate departments or clerks and are under control of the special keys 15 and 471. Any suitable form of totalizer selecting and engaging mechanism may be used for the attainment of this end, as for example, the form shown in the Fuller application and the British patents previously mentioned.

Machines of the type which are provided with a plurality of totalizers are frequently also provided with a corresponding number of cash receptacles designed to take care of the receipts of the different attendants. In this way an absolute check may be placed upon the different operators of the machine since the amounts in the different cash receptacles must agree with the amounts accumulated by the corresponding totalizers.

Figure 2:
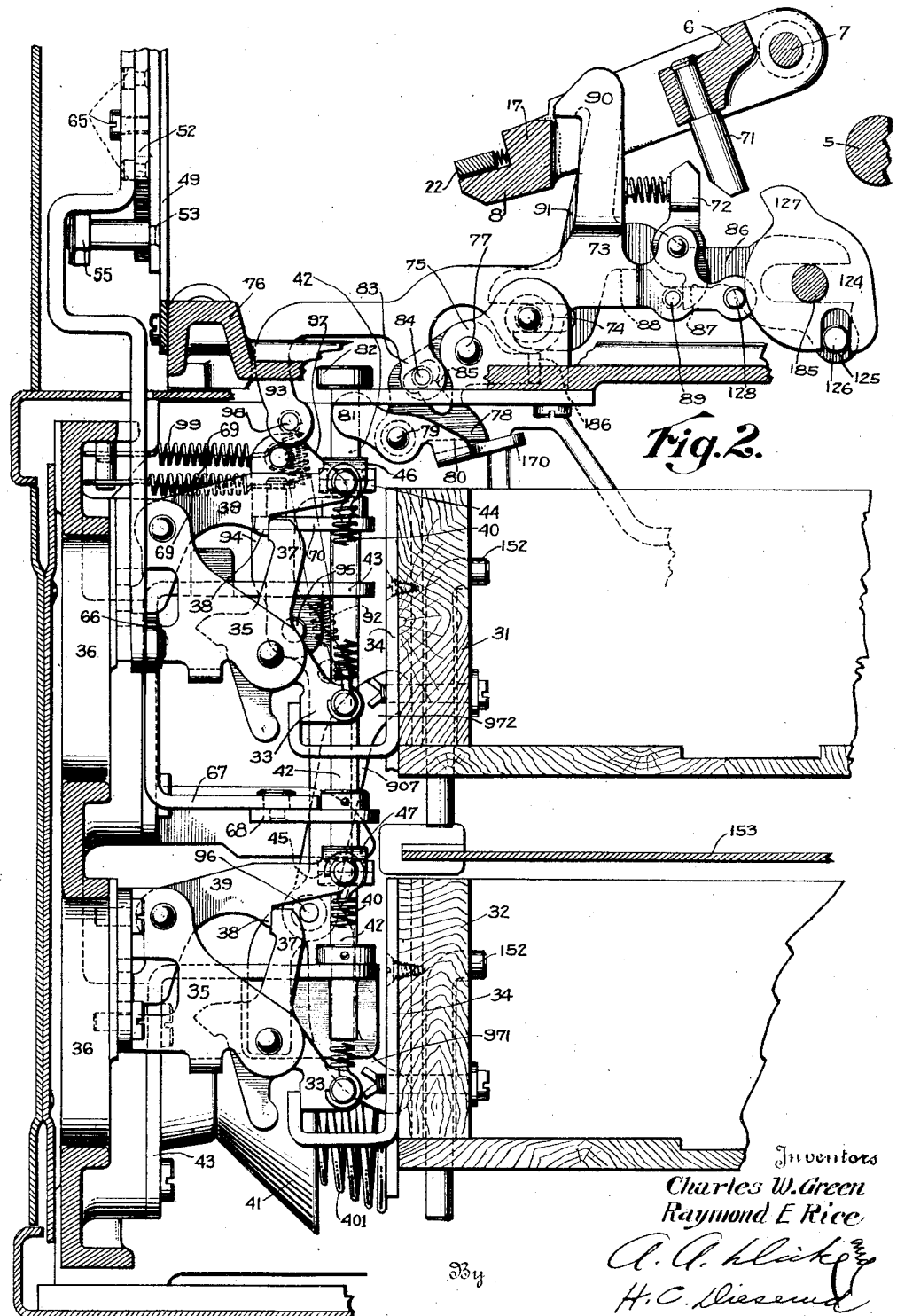
Fig. 2 represents another vertical sectional view of the mechanism for releasing the cash drawers, the means for supporting the same, and the devices used for locking the keys against operation whenever one of a plurality of drawers is opened.

The cash drawers 31 and 32 (Figs. 1 and 2) which in the embodiment shown are arranged vertically, are held shut by drawer catches 33 engaging drawer plates 34 secured to the rear of each drawer. Each drawer catch 33 is pivoted to an angular bracket 35 fastened to the lower rear machine frame 36. Each drawer catch 33 is provided with an upward extension 37 bearing against a projection 38 formed upon a drawer release arm 39 also pivoted to the bracket 35. A spring 40 interposed between the drawer catch 33 and drawer release arm 39 tends to force the extension 37 against the projection 38. Each drawer, when released, is ejected from the cabinet in the usual manner by a spring 401 (Fig. 2). Each drawer release spring is carried by a cone 41, secured to the machine frame 36 and is compressed against the plate 34 when the drawer is forced to its inward position, the force of compression thus stored in the spring 40 being sufficient to expel the drawer outwardly when its respective drawer catch is operated.

From the above it will be readily seen that to release any drawer, all that is necessary is to lift the related release arm 39 so that the projection 38 will be disengaged from the upward extension 37 of the drawer catch 33. To accomplish this there has been provided a vertically disposed finger shaft 42 (Figs. 1, 2, 6 and 7). The shaft 42 is adapted to be given a slight rotary movement as well as a lifting movement, the shaft 42 being guided in its reciprocatory movements by angular plates 43 fastened securely to the rear frame 36 and apertured at its forward end to receive the finger shaft 42. Secured to the finger shaft 42 are two angularly disposed fingers 44 and 45, the finger 44 being disposed beneath a lug 46 (Figs. 2 and 7) integral with the drawer release arm 39 associated with the upper drawer 31 while the finger 45 is beneath a lug 47 integral with the drawer release arm 39 associated with the lower drawer 32.

Figure 7:
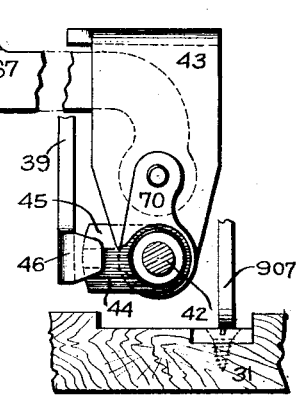
Fig. 7 is a top plan view of the mechanism shown in the perspective view in Fig. 6 and also shows part of one of the drawer release catches.

Referring to Fig. 7 it will be seen that the fingers 44 and 45 are so dimensioned that both fingers are normally beneath their associated lugs 46 and 47 respectively so that in order to release both drawers simultaneously all that is necessary is to give the finger shaft 42 a slight lifting movement. The means for accomplishing this will be set forth hereinafter.

In order to select a particular drawer it will be necessary to rock the shaft 42 one way or the other. When the shaft 42 is rocked counter-clockwise (as viewed in Fig. 7) a certain amount, the finger 44 will be moved so as to bring the said finger out of co-operative relationship with its related lug 46 while the finger 45 still has a portion of its surface under the lug 47. Upon lifting the shaft 42 the lower drawer 32 will be released. To release the upper drawer the shaft 42 is rocked clockwise (Fig. 7) a certain amount to displace the finger 45 out of line with its lug 47 while the finger 44 is still partially under the lug 46, and upon lifting the shaft 42 the upper drawer 31 will be released.

To effect this movement advantage has been taken of a key stop or back hanger which is located between the rear ends of the clerk's keys 15 and 471 (Fig. 5) and moved in one direction or the other, depending upon which clerk's key is depressed as will presently be described.

In machines of this type it is, of course, desirable that means be provided to prevent the simultaneous operation of two or more clerks' keys or amount keys in the same bank. It is also desirable to prevent an operation of an amount key before the depression of a clerk's key and to this end the following mechanism is utilized.

Figure 5:
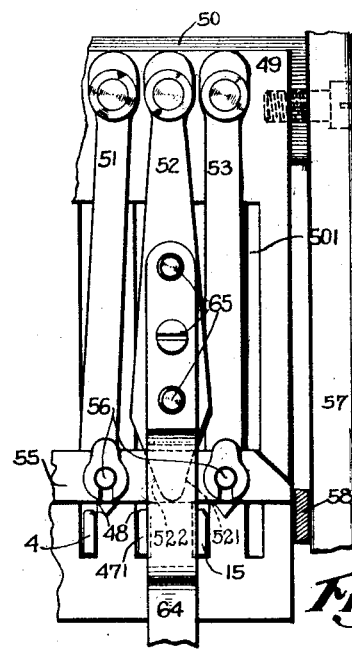
Fig. 5 is a detail view of the key stop mechanism and the arrangement used to set the proper drawer release device whenever the corresponding clerk's key is depressed.

Referring to Fig. 5 it will be seen that the rear edge of each clerk's and amount key is provided with an upwardly facing wedge shaped portion 48. A guide plate 49 is attached by any desirable means to a cross frame 50 secured between the main side frames of the machine, and is furthermore provided with guide slots 501 through which the rear ends of the keys project. Between the wedge shaped portions 48 of each key are a plurality of pendants 51, 52 and 53, loosely pivoted to the guide plate 49. The pendants 51 and 53 are secured to a movable bar 55 at 56 while the pendant 52 is free to move independently of the bar 55 and oscillate in a different plane than the pendants 51 or 53 as shown in Fig. 2.

Between the end of the bar 55 and a portion of the frame 57 is the rearwardly extending portion 58 of an arm 59 pivoted upon a transverse shaft 3 (shown in Fig. 9). Normally the portion 58 is between the end of the bar 55 and the inside of the machine side frame 57, the effect of this being that the amount keys are normally locked against depression due to the inability of the pendant 51 to swing to the right as viewed in Fig. 5. In order to release the amount keys all that is necessary is to provide means for withdrawing the portion 58 of the arm 59 so that the bar 55 is free to move. The means for accomplishing this is under the control of either clerk's key 15 or 471 when depressed to its coupling point.

Referring to Fig. 9 it will be seen that the arm 58 is provided with a slot 60 formed with a cam portion 62 co-operating with a stud 63 secured to the coupler 6. As previously stated when a clerk's key is depressed the coupler will be elevated a partial amount and during this movement the stud 63 cooperating with the cam slot 62 will elevate the rear end 58 above the bar 55. When in this position the coupler 6 will be held in its lifted position, and the amount keys 4 will be free to be depressed and latched to the coupler 6 as premised hereinbefore.

It will also be noted from Fig. 5 that as one of the clerk's keys 15 or 471 is depressed, and as the rear end, shown in this figure, of the depressed clerk's key rises it will oscillate the pendant 52 either one direction or the other, by striking one or the other of the cam edges 521 and 522 of the pendant thereby bringing the pendant 52 over the rear end of the undepressed clerk's key and preventing a simultaneous operation of both clerk's keys.

Figure 6:
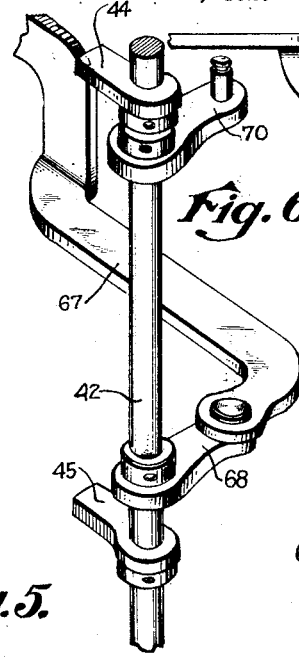
Fig. 6 is a detail perspective view showing the drawer release shaft, the drawer catch selecting lugs carried thereby and means for rocking the shaft to bring the desired lug into effective operation.

As stated hereinbefore advantage has been taken of the movement of the pendant 52 to set the fingers 44 and 45 to the desired positions so that upon a subsequent lifting movement of the finger shaft 42 the desired drawer will be released. The connections for doing this include a bar 64 secured at 65 to the pendant 52 so as to be movable therewith. The bar 64 is articulated at 66 to an arm 67, bent as shown in Fig. 6, and connected to an arm 68 secured to the shaft 42. Due to the pivotal connection at 66 the shaft 42 and arm 67 may be given a slight lifting movement without affecting the bar 64. This eliminates any necessity for a splined construction between the shaft 42 and the member which rocks it to the desired position. In order to return the shaft 42 after it has been rocked a spring 69 is interposed between the frame 36 and an arm 70 secured to the shaft 42 as seen in Fig. 2. From the above it will be evident that an oscillation of the pendant 52 will, through the bar 64, and arms 67 and 68 rock the shaft 42 thereby disengaging one finger from co-operation with its related lug and retaining the other finger and lug in their proper relationship depending upon which clerk's key has been operated.

For lifting the shaft 42 the coupler 6 is provided with a downwardly extending trip member 71 which is in the plane of a spring-pressed actuating pawl 72 pivoted to a plate 73 which in turn is pivoted at 74 to a bracket 75 attached to the base 76 of the machine. Pivoted to the bracket 75 at 77 is a plate 78 to which is loosely pivoted at 79 a bail 80 having upward extensions 81 underlying a collar 82 secured to the shaft 42. The drawer catch release lever 73 is provided with a downward extension 83 carrying a stud 84 co-operating with a T shaped slot 85 in the plate 78. The plate 78 is provided with a forward extension or tail 186, the function of which will appear hereinafter.

The operation of the parts thus far described is as follows: On the downward stroke of the keys the coupler is elevated and the trip member 71 forces the actuating pawl 72 rearwardly until the trip member 71 clears the pawl 72 whereupon the said pawl will swing forwardly taking a position just forward of the trip member 71. On the return stroke of the keys the coupler descends and the trip member will strike the actuating pawl 72 thereby rocking the drawer catch release lever 73 clockwise (Fig. 2) about its pivot 74. Through the co-operation of the stud 84 and slot 85 in the plate 78 the bail 80 will be raised upwardly and by virtue of the extension 81 underlying the collar 82 will lift the finger shaft 42. At this time a particular release finger is in engagement with the lug and its related drawer release arm 39 so that the desired drawer will be exposed when the finger shaft 42 is elevated.

The illustrative machine is further provided with mechanism whereby the keys are locked against operation while the cash drawer is in its exposed position. While at times it is desirable to have the mechanism arranged so that it will be necessary to close the drawer at the end of each operation so as not to leave the money contained therein exposed and accessible to other attendants, it is often desirable to disable the mechanism just described so as to permit of an operation of the machine during rush hours without closing the cash drawer after each operation. In the performance of these functions, as well as others which will be set forth, the mechanism for accomplishing the same is placed under control of a key operated lock located at the upper right hand side of the machine just above the keys.

The mechanism shown in Fig. 2, is shown with the parts adjusted in such a manner as to permit successive operations of the machine without returning the drawers to their inward positions. Slidably mounted upon a transverse shaft 185 and the pivot stud 74 is a locking slide 86 bifurcated at its extreme ends to receive the said shaft and stud. The lower edge of the locking slide is provided with a horizontal edge 87 and a notch 88, either of which may co-operate at times with a pin 89 secured to the forward end of the drawer catch release lever. The said drawer catch release lever 73 and locking slide 86 are further provided with hooks 90 and 91, respectively, adjacent to each other and adapted to overlie the coupler 6 at certain times.

A coil spring 92 (Figs. 2 and 12) is interposed between an extension 93 of the drawer catch release lever 73 and a lever 94 which is pivoted at 95 to a downward extension of the bracket 43. The lever 94 has pivoted at 96 a beam 907 contacting at 971 and 972 with the rear ends of the drawers 32 and 31 respectively. (See Fig. 12.) The upper end of the lever 94 is provided with a cam edge 97 co-operating with a stud 98 carried by the extension 93 of the drawer catch release lever 73 while a spring 99 tends to draw the upper end of lever 94 rearwardly.

The parts in Fig. 2 are shown adjusted so that the machine may be operated successively without requiring the drawer to be closed between operations. It will be evident that when the machine is operated to open either drawer, one of the points of contact 971 or 972 between the beam 907 and the drawer will be relieved as the drawer opens, permitting the spring 99 to draw the upper end of the lever 94 rearwardly. The spring 92 will tend to pull the extension 93 downwardly thus tending to draw the hook 90 over the coupler, but this action will be prevented due to the contact between the stud 89 and the horizontal edge 87 of the locking slide 86.

In order to permit the hook 90 to overlie the coupler when a drawer is exposed all that is necessary is to permit the stud 89 to rise and occupy a place in the cutaway portion 88 of the locking slide 86. To allow this the slide must be moved forwardly a slight amount, the means for accomplishing this being under control of an exteriorly operated lever, as will now be described.

This mechanism comprises an adjustable lever 101 (Figs. 1 and 8) loosely pivoted upon a transverse shaft 102 which may occupy and be locked in any of four different positions. The lever 101 has secured thereto by means of a member 108 a concentric plate 103 slidable beneath the cabinet 104 of the machine. The plate 103 carries a pointer 105 slidable in a slot (not shown) formed in a second concentric plate 106 secured to the cabinet by screws 107. The plate 106 has engraved thereon legends comprising characters and words representing the different modes of operating the machine.

A lock 109 is attached to the member 108 by any suitable means and has its barrel projecting through a slot formed in the indicating plate 106. The bolt of the lock is provided with a flange 110 adapted to engage notches 111 in a plate 112 secured to the side frame of the machine. The plate 112 is further provided with upwardly and forwardly extending guide ears 113 co-operating with slots formed in downward extensions 114 of the plate 103. The bolt is furthermore provided with a slot 115 which is adapted to be brought into the plane of the plate 112 by rotation of the bolt. For aligning the control lever in its adjusted positions there is provided an aligning pawl 116 carrying a stud 117 urged upwardly by a spring 118 to engage the wedge shaped notches 119 formed on one side of the plate 112.

To adjust the control lever 101 to any desired position all that is necessary is to insert the key of the lock to rotate the key a quarter turn to bring the slot 115 in the plane of the plate 112. By moving the key and parts movable therewith so that the pointer 105 is adjacent the desired legend, and then giving the key a quarter turn in the reverse direction, the flange 110 will co-operate with the notches 111 thus locking the control lever in its new position. After the key has been removed it will be impossible to adjust the control lever 101 to any other position and only the proprietor, who generally has possession of the key to the lock can change the setting.

The control lever 101 is provided with a gear sector 120 meshing with a mutilated pinion 121 secured to one end of the key shaft 5. Also secured to the shaft 5 is a somewhat larger gear sector 122 meshing with another gear sector 123 secured to the transverse shaft 185 which, as shown in Fig. 2, carries a disk 124 capable of being moved to different positions by adjustment of the general control lever 101. The disk 124 has a notch 125 engaging a stud 126 secured to the forward end of the locking slide 86.

When the control lever is moved upwardly from an "open drawer" position to "closed drawer" by means of the train of mechanism just described, the shaft 185 will be rotated counter-clockwise from the position shown in Fig. 2 rotating the disk and through the co-operation of the stud 126 and notch 125 will draw the slide 86 forwardly. The stud 89 will now register with the notch 88 allowing the hook 90 to overlie the coupler when either drawer is exposed.

Whenever a drawer is released the extension 93 will not be held up as in the case when in "open drawers" position, but will drop downwardly under the influence of the spring 92, the stud 84 playing in the vertical portion of the T slot 85. Since the stud 84 normally holds up the plate 78 by virtue of its co-operation with the horizontal portion of the slot as shown in Fig. 2, the plate 78 and attached bail 80 will tend to drop downwardly whenever the stud 84 occupies the lower vertical portion of the T slot 85 and thereby would permit the bail to contact with the upper portion of the drawer 31 if no means were provided to prevent it. In order to prevent this, therefore, the plate 78 is provided with the tail 186 mentioned hereinbefore which will at such times co-operate with the underside of the drawer catch release lever 73 (Figs. 2 and 10) and hold the plate 78 and parts carried thereby away from the drawer 31 in the position shown in Fig. 2.

As before stated, when the released drawer moves outwardly the hook 90 will be rocked to overlie the coupler 6 thus preventing any operation of the keys until the drawer is again closed. When the exposed drawer is pushed inwardly the rear end of the drawer which is being returned will contact with the corresponding end of beam 907 thereby rocking lever 94 clockwise about its pivot 95. The cam edge 97 of the lever 94 contacting with the stud 98 will elevate the extension 93 of the drawer releasing member 73 thereby bringing the hook 90 away from the coupler 6 and releasing the machine for a subsequent operation.

At the end of a day's business or the termination of any arbitrary period it is desirable to condition the machine for recording the totals of the amounts registered during the preceding period and to prepare it for the entering of transactions occurring during a subsequent period. To place the machine in this condition the general control lever is set to a position designated as "Total and reset, release drawers." When in this position certain lids hinged to the cabinet are unlocked to permit totals to be printed from the totalizer and give access to the totalizer resetting mechanism. One suitable form of mechanism for the purpose being disclosed in the Fuller application and British patents already mentioned. At the same time both drawers are released so that the proprietor can extract the money from both drawers. This is also a convenient means for permitting the proprietor at any time and for any reason whatsoever to obtain access to either or both drawers without operating the machine.

The means for accomplishing this last feature comprises a projection 127 integral with the disc 124 and adapted to strike a stud 128 secured to the extreme forward end of the drawer catch release lever 73. As has been stated before, the releasing fingers 44 and 45 are normally both beneath their related lugs on the drawer release arms 39.

Whenever the general control lever 101 is moved upwardly to the uppermost position (Fig. 8) the disk 124 will be rotated counterclockwise as viewed in Fig. 2 until the projection 127 strikes the stud 128 rocking the drawer catch release lever 73 about its pivot and thereby lifting the finger shaft 42 to simultaneously release both drawers 31 and 32.

After printing the totals and resetting the totalizer by suitable means, such as disclosed in the applications and British patents mentioned, it is often desirable to lock the machine against any operation and to do this the general control lever is moved downwardly to a position designated as "Lock register". The disk 124 will at this time be rotated clockwise as viewed in Fig. 2 and co-operation of the stud 126 and notch 125 will force the hook 91, integral with the locking slide 86, and similar to hook 90 rearwardly until it overlies the coupler thus preventing any operation of the keys, regardless of the condition of the drawers.

Figures 3, 4:
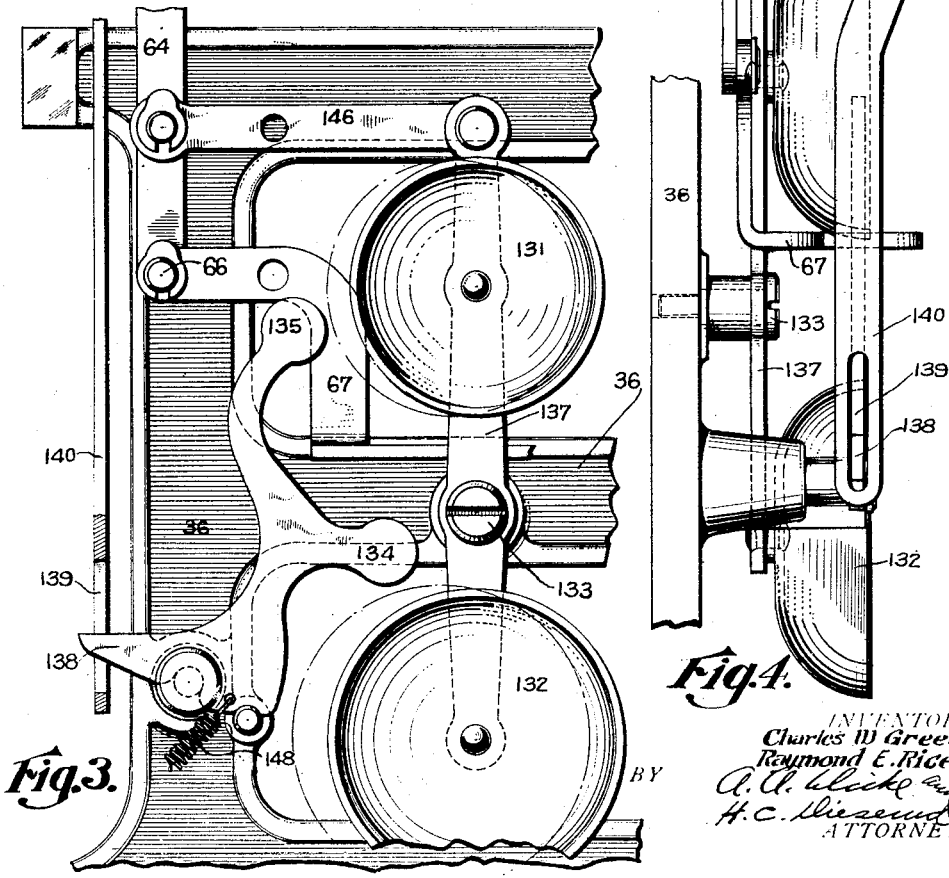
Fig. 3 is a view in side elevation of the differently toned alarms, the means for sounding the same and the devices for bringing the desired alarm into co-operative relationship with the latter.
Fig. 4 is a view taken at right angles to the view in Fig. 3 showing substantially all of the parts shown in the first mentioned figure.

As stated before the register shown in the drawings has been provided with an audible signal, one for each drawer, each of which is sounded when its respective cash drawer is opened. In order that each clerk may distinguish his signal from the others, it is desirable to give each signal some characteristic sound or tone, which shall be loud and clear enough to be heard by the clerk when some distance from the machine. These signals preferably consist of bells or gongs 131 and 132, both of which are illustrated in Figs. 1, 3 and 4. The bells are of a different size and composed of a different material so as to ring out a tone distinguishable from each other when struck and they are located between the rear end of the drawers and the frame 36.

The bells are preferably mounted upon a lever 137 (Fig. 3) pivoted at 133 to the frame 36 and which may be oscillated to bring either bell in a position to be struck by a spring actuated double hammer 134 and 135 pivoted to the frame 36. The hammers are provided with a tail portion 138 engageable with a slot 139 in an actuating bar 140. The bar 140 is connected to an arm 141 (see Fig. 1) pivotally carried by a pivot stud 142 secured to the side frame and urged upwardly by a spring 147. This arm is further provided with a tail 143 lying in the path of a wiper or cam 144 mounted on a disc 145 secured to the rotation shaft 10, which it will be recalled, is rotated during each operation of the machine.

In order to swing the bells from the position shown in Fig. 3 to a position whereby one or the other may be struck the upper end of the lever 137 is connected to the bar 64 by a link 146.

The result of the above construction is that when a drawer selecting key is operated (clerk's key 15 for example) the bell 131 will be rocked to the dotted line position shown in Fig. 3, the bell 132 being moved away from its related hammer 134. Upon a further movement of the keys the cam 144 will strike the tail 143 forcing the arm 141 and actuating bar 140 downwardly against the tension of the coiled spring 147. The bar 140 will depress the tail 138 and retract the hammer 135 against the tension of its spring 148. At a predetermined time the cam 144 will pass over and clear the tail 143 permitting the arm 144 and actuating bar 140 to be quickly released thereby permitting the hammer 135 to strike its respective bell 131 and ring the same.

In order to ring the bell 132 the clerk's key 471 is depressed bringing the lower bell 132 into the path of its related hammer 134 as shown in dotted lines in Fig. 3. The operation of the parts to ring the bell 132 is substantially the same as that just described and in view of the above description it is believed that a further explanation is not necessary.

It is at times desirable to prevent the constant ringing of the bells during rush hours and means are, therefore, provided for disabling the striking mechanism for the bells just described. The bell muffler in the present embodiment comprises a lever 149 (Fig. 1) pivoted to a stud 150 and having a lug 151, the lever being movable manually so that the lug engages the arm 141 and moves the tail 143 away from the cam 144 so that the arm 141 will not be actuated during an operation of the machine. The lever 149 has a handle which is under a cover which is unlocked whenever the general control lever is adjusted to its "total and reset" position. The lever may be held in its set position by any suitable frictional means.

The mechanism as thus far described is substantially complete and practically operative, but some devices, which may be called precautionary devices are desirable to prevent one clerk from obtaining access to drawers, over which he is not entitled to have any control without producing a record of the access which he has had.

Due to the vertical disposition of the drawers it would be possible for a clerk to remove a drawer and obtain access to the contents of the drawer located beneath. Generally cash drawers may be removed by opening the drawer and lifting a drawer stop 152 (Fig. 2) slidably mounted in the rear portion of each drawer which would normally permit the upper drawer, for example, to be entirely withdrawn and thus enable a clerk to extract any money contained in the lower drawer. To prevent this a shield 153 is placed between the drawers 31 and 32. However, this does not accomplish the desired results because even with this protective measure it would still be possible for any clerk to release all the drawers by opening any drawer, inserting his hand within the space previously occupied by the withdrawn drawer and elevating the finger shaft 42 thereby releasing all the drawers. To overcome the above mentioned objection mechanism has been designed to prevent the complete removal of any drawer until the general control lever is in a certain position "total and reset", in the present instance.

This mechanism is best shown in Fig. 1 and comprises a lever 155 pivoted to the drawer base frame 157 at 156 and bifurcated at its forward end to receive a stud 158 secured to an arm 159. A bell crank 160 is pinned to the said arm and is provided with two lugs 161 which are normally in the path of lugs or abutments 162 secured to the drawers 31 and 32. The rear end of the lever 155 is provided with a slot comprising a concentric portion 163 and a cam portion 164 co-operating with a stud 165 carried by the lower end of a lever 166 pivoted to the frame 157 and provided with a segmental rack 167 meshing with the teeth of the pinion 123 hereinbefore referred to.

From the above it will be clear that whenever the control lever is in any other position than its "total and reset" position the stud 165 will merely play in the concentric portion 163 of the slot just mentioned. It will, therefore, be impossible to remove any drawer due to the engagement of the lugs 161 and 162.

When, however, the control lever 101 is adjusted to its "total and reset" position, the rotation of the pinion 123 will, through the segmental rack 167, bring the stud 165 rearwardly. Since the stud will play in the cam slot 164 the forward end of the lever 155 will be depressed thereby bringing the lugs 161 out of the path of the lugs 162 secured to the drawers 31 and 32. The drawers may now be entirely removed, but such removal is only under the control of the proprietor, or a service-man, or other authorized persons who have possession of the key to the lock.

In the construction and manufacture of multiple drawer machines it is desirable that the registering devices and multiple drawer mechanism be assembled as a unit and be capable of separation at will in case of repairs and adjustment.

The drawers 31 and 32 are slidably mounted in two side frames, one designated by reference numeral 157 (Fig. 1) and which are held together by the rear frame 36, which supports the drawer releasing mechanism. The registering devices are mounted on the base 76 which rests upon the frames 157 and 36 and is attached by suitable screws. In order to disengage the shaft 42 from the extension 81 which elevates it at the desired time the bail 80 is provided with an extension 170. By releasing and withdrawing the upper drawer 31 and then depressing the extension 170 the shaft 42 will be elevated until the extension 81 clears the collar. The collar 82 will then drop below the extension 81 and the base 76 may be removed from the lower drawer frame without any difficulty.

In order to fully explain the operation of the improvements a summary will be given of what the parts do during an item entering operation by one of the clerks.

Assume, for example, that a cash transaction of $7.45 is to be made by the clerk who has control over the lower drawer 32. Assume also that the machine is in an "open drawers" position, which as has been stated hereinbefore, permits of the successive operation of the machine without requiring the drawer to be closed. The clerk first depresses his key 15 to the coupler lifting position. During the depression of the key 15 the cam edge 16 contacting with the shoulder 151 on the coupler lifts the coupler to a predetermined position until the rear edge thereof contacts with the edge 18 of the notch 19 in the key 15. The coupler will be held in its elevated position by virtue of the pawl 14 and ratchet wheel 13 hereinbefore mentioned. As the clerk releases the pressure upon his key, it will fall back until the finger 20 strikes the top of the angular piece 21 attached to the key coupler.

This partial elevation of the coupler is sufficient to cause the stud 63 to rock the lever 59 until its end 58 is out of the path of bar 55 so that other keys may now be attached to the coupler and the transaction completed by depressing any selected amount key. The clerk may therefore next depress the $7.00 key a slight amount until the sliding plate 22, on the coupler, associated with the dollars bank enters the notch 9 in the $7.00 key. In the same manner the 40¢ key in the dimes bank and the 5¢ key in the cents bank are also attached to the key coupler 6.

During the time the key 15 was depressed to its coupling point one of the totalizers A or B was thrown into mesh with the actuators by means which are shown in detail in the application of Frederick L. Fuller, Serial No. 263,125, and the British patents mentioned. Upon further depression of the amount keys the segmental racks 29 will rotate the totalizer pinions amounts corresponding to the keys depressed, and in this manner the items are entered into the totalizers. The item type wheels 30 will also be actuated by the segmental racks 29 and will be adjusted to positions corresponding to the values of the keys depressed, and at substantially the extreme limit of the downward stroke of the keys, the totalizer will be thrown out of mesh with the actuators and a platen (which is not shown in the drawings) will be actuated to make a print upon the record strip. These features constitute no part of the present invention and are referred to merely for the purpose of explaining the general relation of the novel parts to what is old.

As shown in the two applications of Frederick L. Fuller and in the British patents indicators are also elevated and adjusted to inform the public and others the amounts of the sale, the nature of the transaction, and the clerk operating the machine. As stated hereinbefore the depression of an amount key before a clerk's key is prevented by virtue of the arm 59, the rearwardly extending portion 58 of which is normally between the bar 55 and the machine side frame 57.

The means by which the lower drawer 32 is released will now be briefly explained. As the key 15 is depressed the pendant 52 will be rocked clockwise (Fig. 5) thereby rocking the bar 64, shifting the link 67 and rotating the shaft 42 counterclockwise (Fig. 2) so that the lug 44 is moved sufficiently to bring it out of co-operative relationship with its related drawer latch 39, while the lug 45 is still retained in co-operative relationship with the drawer latch 39 of the lower drawer 32. The lugs will be held in their adjusted position during the remaining downward stroke of the keys and during this period the downwardly extending trip member 71 (Fig. 2) will force the pawl 72 rearwardly until the trip member 71 clears the said pawl. During the upward stroke of the keys the coupler will descend and the lower edge of the trip member 71 will strike the pawl 72 and lift the rear end of the drawer catch release lever 73. The drawer catch release lever 73, by means of the stud 84 and the bail 80 will lift the extension 81 thereby lifting the collar 82 and finger shaft 42. Since the lug 45 has been held in co-operative relationship with the latch 39, the elevation of the shaft 42 will lift the drawer latch 39 thereby permitting the drawer spring to expose the lower cash drawer.

Since the parts have been assumed to be adjusted for the "open drawer" position of the machine, the stud 89 contacting with the horizontal edge 87 of the locking slide 86 will prevent the hook 90 from hooking over the coupler 6 when the rear edge 93 of the drawer catch release lever 73 is pulled downwardly by the spring 92. Either of the clerks can now operate the machine successively without requiring the drawer to be closed between intermediate operations of the machine.

While the bar 64 was being moved by a depression of the clerk's key 15, the bar 146 was also rocking the lever 137 counterclockwise about its pivotal point 133 thereby bringing the bell 131 into the dotted line position shown in Fig. 3, in the path of hammer 135 and moving the bell 132 out of the path of the bell sounding hammer 134. During the downward stroke of the keys, the cam 144 will strike the tail 143 moving the bar 140 downwardly thereby depressing the tail 133 and retracting the hammer 134 against the tension of the spring 148. At a predetermined time the bar 140 will suddenly move upwardly permitting the bell hammer 135 to strike the bell 131 thereby informing the public and others that the machine has been operated and a particular drawer exposed.

If it is desired to release the upper drawer 31 all that is necessary is to depress the other clerk's key 471. During this depression the shaft 42 will be rocked clockwise as viewed in Fig. 7) to such an extent that the lug 45 will be withdrawn from co-operative relationship with its related drawer latch 39, while the lug 45 is still retained in co-operative relationship with its related drawer latch 39. The shaft 42 will be elevated to expose the upper drawer in a manner similar to that described in connection with the releasing of the lower drawer 32. When the clerk's key 471 is depressed, the bell 132 will be brought into the path of the bell sounding hammer 134 and the latter will strike the bell as the machine is operated and will ring out a tone different from that of the bell 131.

If the proprietor at any time desires to operate the machine in a "closed drawers" condition, he inserts his key to the lock 109 and adjusts the centralized control lever 101 until the pointer is adjacent the words on the indicator plate designating "Closed drawers". The operation of the machine to release the desired drawer is similar to that which has just been explained, with the exception that the locking slide 86 is now adjusted so that the notch 88 therein registers with the stud 89 carried by the drawer catch release lever 73. As the desired drawer is moved outwardly one of the points 971 or 972 of the beam 907 will be relieved of its contact with the rear edge of one of the drawers and this will permit the upper end of the lever 94 to be drawn rearwardly by the spring 99. Since the stud 98 carried by the downward extension 93 of the drawer catch release lever 73 is now unsupported, and since the stud 89 can now enter the notch 88, the hook 90 will move over the coupler and lock the machine against operation. Whenever the exposed drawer is forced within the register cabinet the cam edge 97 of the lever 94 contacting with the stud 98 will force the hook 90 backwardly and unlock the key coupler and operating keys.

At the expiration of an arbitrary period of business when it is desired to condition the machine for total printing and so as to be capable of accumulating items and obtaining records of business pertaining to a subsequent period, the lock 109 is unlocked and the pointer set to a position reading "Total reset, release drawings". At the time the locking lever 101 is adjusted to this position, the projection 127 will strike the stud 128 rocking the drawer catch release lever 73 (clockwise as viewed in Fig. 2) and by virtue of the extension 81 contacting with the collar 82 will lift the shaft 42. Since the lugs 44 and 45 are normally adjusted so that they are both beneath their drawer catches 39 the elevation of the shaft 42 will actuate both drawer catches thereby exposing both cash drawers simultaneously.

As has been explained the cash register shown in the present application has means for preventing the total extraction of a cash drawer which would permit a clerk to manipulate the finger shaft 42 to release the drawers over which he should have no control. This is accomplished by the action of the lugs 161 normally contacting with the lugs 162 carried by plates secured to the rear ends of the cash drawers. Sometimes it is necessary to completely withdraw the cash receptacles and the means for accomplishing this is under control of the proprietor's lock and only when adjusted to the "total reset, release drawers" position. At this time the shaft 5 will be rotated to such an extent that the gear pinion 123 which meshes with a gear pinion secured to the shaft 5 will actuate the segmental rack 167 to such an extent that it will cam the rear end of the lever 155 upwardly. The movement of the lever 155 will bring the lugs 161 out of the path of the lugs 162 and permit the complete extraction of all of the cash drawers.

If at any time it is desired to detach the register mechanism from the drawer release mechanism all that is necessary is to totally extract the upper drawer 31, and depress the manipulative device 170 until the extension 81 clears the collar 82. The extension 81 will then stand above the collar 82 and permit the frame upon which is mounted the cash register mechanism to be detached from the lower frame, in which are mounted the drawers and the mechanism for releasing them.

While the form of mechanism herein shown and described is admirably adapted to fulfill the objects primarily stated, it is to be understood that it is the desire not to confine the invention to the one form of embodiment shown and described, as it is susceptible of embodiment in various forms all coming within the scope of the claims which follow.

We claim:

1. In a cash register, the combination of an operating mechanism, a plurality of normally inaccessible cash drawers, a corresponding number of special keys, an element moved to different positions upon partial operation of said keys depending upon the special key operated, drawer release mechanism positioned by the movement of said element to select a desired receptacle, and means under control of the operating mechanism for actuating the drawer release mechanism to expose the selected receptacle.

2. In a cash register, the combination of an operating mechanism, a plurality of normally inaccessible cash drawers, and a corresponding number of special keys, an element moved to different positions depending upon the special key operated and adapted to prevent depression of one of said special keys when another thereof is depressed, drawer release mechanism positioned by the movement of said element to select a desired receptacle and means under control of the operating mechanism for actuating the drawer release mechanism to expose the selected receptacle.

3. In a cash register, the combination of an operating mechanism, a plurality of normally inaccessible cash drawers and a corresponding number of special keys, a pendant hung between the rear ends of the keys and adapted to be moved to different positions upon partial operation of said keys depending upon the key operated, drawer release mechanism positioned by the movement of said element to select a desired receptacle, and means under control of the operating mechanism for actuating the drawer release mechanism to expose the selected receptacle.

4. In a cash register, the combination of a plurality of normally inaccessible cash drawers, a corresponding number of drawer selecting keys, amount keys, locking means for preventing an operation of the amount keys until a drawer selecting key has been operated, drawer releasing mechanism operated by said amount keys for exposing the selected drawer, and means under control of the drawer selecting keys for simultaneously disabling the locking means and setting the drawer releasing mechanism for the selection of a desired drawer.

5. In a cash register, the combination of a plurality of normally inaccessible cash drawers, a corresponding number of drawer selecting keys, amount keys, locking means for preventing an operation of the amount keys until a drawer selecting key has been operated, drawer releasing mechanism for exposing the selected drawer, means under control of a drawer selecting key for simultaneously disabling the locking means and setting the drawer releasing mechanism to select a desired drawer, and an operating mechanism controlled by said amount keys for actuating the drawer releasing mechanism to release the desired drawer.

6. In a cash register, the combination of a plurality of cash drawers, of latches for the drawers, common means for unlatching the drawers, a plurality of drawer selecting keys corresponding to the number of drawers, amount keys, locking means normally preventing operation of the amount keys, and means under control of a drawer selecting key for disabling the locking means and subsequently under the control of the amount keys for operating the first mentioned means to release a latched drawer.

7. In a cash register, the combination of a plurality of normally latched cash drawers, a plurality of latches one for each drawer, a shaft carrying a plurality of elements for operating the latches simultaneously or singly, a plurality of drawer selecting keys, a member movable to different positions by said drawer selecting keys, and connections from said member to said shaft for bringing one of the elements on the shaft into co-operative relationship with a drawer latch.

8. In a cash register, the combination of a plurality of normally latched cash drawers, a corresponding number of drawer selecting keys, latches one for each drawer, common means for operating said latches to permit exposure of a selected drawer, amount keys, means normally locking the amount keys, and movable means controlled by a drawer selecting key for releasing the amount keys during one portion of the movement of said means and subsequently controlled by the amount keys for operating a latch to expose the selected drawer during the remaining portion of said movement.

9. In a cash register, the combination of a plurality of normally latched cash drawers, a corresponding number of special keys, latches one for each drawer, latch operating devices all of which are normally in operative relationship with their corresponding latches, and means operated by any one of said special keys for changing the relationship between said latches and devices so that only one latch will be in operative relationship with its related operating device.

10. In a cash register, the combination of a plurality of normally latched cash drawers, a corresponding number of special keys, latches one for each drawer, latch operating devices all of which are normally in operative relationship with their corresponding latches, and means operated by any one of said special keys for changing the relationship between said latches and devices so that only one latch will be in operative relationship with its related latch operating device, said means subsequently operating said device to expose a desired drawer.

11. In a cash register, the combination of a plurality of cash drawers, a set of latches for the same, lugs normally in co-operative relationship with all the latches, a shaft carrying all the lugs and capable of being elevated to simultaneously actuate all the latches, means for retaining one lug in co-operative relationship with its latch and withdrawing the others from co-operative relationship with their latches, a key coupler, and connections from the key coupler to the shaft for lifting the shaft to operate a latch to release the corresponding drawer.

12. In a cash register, the combination of a plurality of cash drawers, a set of latches for the same, a key coupler, a plurality of special keys with provisions for lifting the key coupler to a certain position and arresting its movement at that point, a shaft carrying lugs for selectively operating the drawer latches, means under control of the special keys for operating the shaft to bring the desired lug into co-operative relationship with its related latch while the coupler is being lifted by the special key, and means whereby said coupler subsequently operates said shaft to release the selected drawer.

13. In a cash register, the combination with a plurality of special keys and a corresponding number of normally closed drawers, of an operating mechanism, latches for the drawers and a member actuated by the keys movable to only two different positions from normal for rendering the latches selectively operable by the operating mechanism, said member preventing depression of one of said keys when another of said keys is depressed.

14. In a cash register, the combination of a plurality of cash drawers, latches for the cash drawers for holding them closed, a main operating mechanism amount keys for driving the latter, special keys for selectively controlling the release of said cash drawers upon an operation of the main operating mechanism, means for preventing an operation of the amount keys until a special key has been depressed, and an additional means for operating the latches to release all the drawers simultaneously without an operation of the main operating mechanism.

15. In a cash register, the combination of an operating mechanism including a key coupler, a plurality of special keys for elevating the coupler to a certain position and then arresting its motion at that point, a plurality of cash drawers, latches for the same, means under control of the special keys for operating a latch to release a drawer during an operation of the main operating mechanism, and a common supplemental means for simultaneously rendering all the drawers accessible without an operation of the main operating mechanism.

16. In a cash register, the combination of an operating mechanism including a key coupler, a plurality of special keys for elevating the coupler to a certain position and then arresting its motion at that point, amount keys for completing the operation of the coupler, locking mechanism normally preventing operation of the amount keys, a plurality of cash drawers with latches for holding them closed, means under control of the special keys for operating a latch to release a drawer by an operation of the main operating mechanism and for disabling the locking mechanism, and a supplemental means for rendering all the drawers accessible without an operation of the main operating mechanism.

17. In a cash register, the combination of an operating mechanism, a plurality of drawers, drawer latches for holding them closed, a plurality of drawer selecting keys, lugs selectively positioned by an operation of the drawer selecting keys for operating a latch to release a desired drawer, a lock for operating mechanism controlled by said drawers, and a manipulative device for enabling or disabling the lock and for releasing the drawers simultaneously.

18. In a cash register, the combination of an operating mechanism, a plurality of cash drawers, drawer latches for holding them closed, a plurality of drawer selecting keys, lugs selectively positioned by an operation of the drawer selecting keys for operating a latch to release a desired drawer, a single locking device for the operating mechanism controlled by said cash drawers, and a manipulative device adjustable to three positions, first for enabling the said locking device, second for disabling the said locking device and third to control the release of the drawers simultaneously.

19. In a cash register, the combination of a plurality of cash drawers, a corresponding number of alarms, a common sounding device for said alarms, an operating member, connections therefrom for operating the sounding device and releasing a cash drawer, and means for rocking one of said bells into the path of the sounding device and withdrawing the others and simultaneously selecting a corresponding drawer to be opened.

20. In a cash register, the combination of a plurality of cash drawers, a corresponding number of alarms, latches for normally holding said cash drawers, an alarm sounding device, common means for releasing said latches and operating said sounding device, special keys, and means under control of a special key for selecting a latch to be operated to release a cash drawer and for simultaneously moving the corresponding alarm into co-operative relationship with the sounding device.

21. In a cash register, the combination of a plurality of cash drawers mounted in a cash register cabinet, means preventing their total extraction from the cabinet, a lock and key controlled element, and means controlled by said element for disabling said preventing means whereby said drawers may be removed from said cabinet.

22. In a cash register, the combination of a plurality of cash drawers mounted in a frame, releasing mechanism for said drawers, mounted in said frame and including a reciprocable member, a second frame mounted upon the first mentioned frame and containing operating mechanism for the drawer release mechanism, said operating mechanism including a rockable element adapted to engage said reciprocable member, and manipulative means for shifting said rockable element out of operative relation with said reciprocable member when it is desired to separate the two frames.

23. In a cash register, the combination of a plurality of cash drawers mounted in a cash register cabinet, means for preventing their total extraction from the cabinet and a lever for disabling said means.

24. In a cash register, the combination of a plurality of cash drawers mounted in a cash register cabinet, means for preventing their total extraction, a differentially movable lever for disabling said means, said means being disabled only when the lever is in a particular position.

25. In a cash register, the combination of a plurality of cash drawers mounted in a cash register cabinet, means for releasing them simultaneously, means normally preventing their total extraction from the cash register cabinet, and a single device for operating said releasing means and disabling said means preventing total extraction of the drawers.

26. In a cash register, the combination of a cash drawer mounted in a register cabinet, means for preventing its total extraction from the register cabinet, and a lever for controlling different operations of said register and for disabling said means.

27. In a cash register, the combination of a cash drawer, lugs upon the cash drawer normally in the path of adjustable abutments preventing the total extraction of the cash drawer from the register cabinet, and means movable to different positions for controlling certain operations of said register and adapted to move said abutments to bring them out of the path of said lugs.

28. In a cash register, the combination of a plurality of cash drawers, an adjustable member carrying a plurality of abutments, lugs secured to the cash drawers normally in the path of the abutments, and means for simultaneously moving said abutments out of the path of said lugs.

29. In a cash register, the combination of a plurality of cash drawers, adjustable abutments, lugs secured to the cash drawers normally in the path of the adjustable abutments, and a lock controlled lever for moving said abutments.

30. In a cash register, the combination of a plurality of cash drawers mounted in a frame, releasing mechanism for the drawers mounted in said frame, a second frame mounted upon the first mentioned frame and containing the operating mechanism for the drawer release mechanism, a normally operative connection between said operating mechanism and said release mechanism and a manipulative device for detaching the operating mechanism, from the drawer release mechanism when it is desired to separate the two frames.

31. In a cash register, the combination of a plurality of cash drawers mounted in a frame, releasing mechanism for the drawers, mounted in said frame, a second frame mounted upon the first mentioned frame and containing the operating mechanism for the drawer release mechanism, a manipulative device for detaching the operating mechanism from the drawer release mechanism when it is desired to separate the two frames, and lock and key controlled means for giving access to said manipulative device.

32. In a cash register the combination of a plurality of cash drawers, latches for the cash drawers for holding them closed, a main operating mechanism, amount keys for driving the latter, special keys for selectively controlling the release of said cash drawers upon an operation of the main operating mechanism, means for preventing an operation of the amount keys until a special key has been depressed, locking means for the operating mechanism, and a supplemental means for controlling locking of the operating mechanism and for controlling operation of the latches to release all the drawers simultaneously without an operation of the main operating mechanism.

33. In a cash register, the combination of an operating mechanism including a key coupler, a plurality of special keys for elevating the coupler to a certain position and then arresting its motion at that point, a plurality of cash drawers, latches for the same, means under control of the special keys for operating a latch to release a drawer during an operation of the main operating mechanism, a lock for said operating mechanism, and a common supplemental means for enabling or disabling said lock and for rendering all the drawers accessible without an operation of the operating mechanism.

34. In a cash register, the combination of a plurality of special keys, an element cooperating therewith for preventing depression of one of said keys when another of said keys is depressed, a plurality of normally closed cash drawers corresponding with said special keys, and drawer release mechanism controlled by movement of said element whereby a desired cash drawer is selected for operation.

35. In a cash register, the combination of a normally closed cash drawer mounted in a register cabinet, means for moving said drawer to exposed position, and a main operating mechanism for said register, a member movable to a position for locking said operating mechanisms against actuation, means controlled by said member for compelling closure of said drawer before said operating mechanism can be operated, means for preventing total extraction of said drawer from said cabinet, and means controlled by said member for disabling said preventing means.

36. In a cash register, the combination of a normally closed cash drawer mounted in a register cabinet, means for moving said drawer to exposed position, and a main operating mechanism for said register, a member movable to a position for locking said operating mechanism against actuation, means for preventing total extraction of said drawer from said cabinet, and means controlled by said member for disabling said preventing means.

37. In a cash register, the combination of a normally closed cash drawer mounted in a register cabinet, means for moving said drawer to exposed position, means for preventing total extraction of said drawer from said cabinet, a manipulative member for controlling operations of said register, and means controlled by said member for disabling said preventing means.

38. In a cash register, the combination of a plurality of cash drawers, a plurality of latches one for each drawer, a plurality of lugs one for each of said latches, all of said lugs being normally in operative relationship with their respective latches, and means for withdrawing all but one of said plurality of lugs from operative relationship with their respective latches.

39. In a cash register, the combination of a plurality of cash drawers, a plurality of latches one for each drawer, a plurality of lugs one for each of said latches, said lugs being normally in cooperative relationship with their respective latches, means for withdrawing all but one of said plurality of lugs from cooperative relationship with their respective drawer latches when all of said lugs are moved in one direction from normal position, means for withdrawing all but another of said plurality of lugs from cooperative relationship with their respective drawer latches when said lugs are moved in another direction from normal position.

40. In a cash register the combination of a plurality of cash drawers, a set of latches one for each drawer, a shaft, a set of lugs one for each of said latches attached to said shaft, said lugs being normally in cooperative relationship with their respective latches, means for moving said shaft in one direction from normal position to withdraw all but one of said lugs from cooperative relationship with their respective latches, means for moving said shaft in another direction from normal position to withdraw all but another of said lugs from cooperative relationship with their respective latches, and means for actuating said shaft to release the selected drawer during normal operations of the register and additional means for actuating said shaft to simultaneously release all of said drawers.

In witness whereof we have signed our names hereto this 23rd day of March, 1925.

CHARLES W. GREEN.
RAYMOND E. RICE.